(12) United States Patent
Lee et al.

(10) Patent No.: US 9,112,639 B2
(45) Date of Patent: Aug. 18, 2015

(54) APPARATUS FOR TRANSMITTING/RECEIVING VARIABLE-WAVELENGTH OPTICAL SIGNAL

(71) Applicant: Electronics and Telecommunications Research Institute, Daejeon-si (KR)

(72) Inventors: Jyung-Chan Lee, Daejeon-si (KR); Eun-Gu Lee, Daejeon-si (KR); Sil-Gu Mun, Daejeon-si (KR); Eui-Suk Jung, Daejeon-si (KR); Sang-Soo Lee, Daejeon-si (KR)

(73) Assignee: ELECTRONICS AND TELECOMMUNICATIONS RESEARCH INSTITUTE, Daejeon-Si (KR)

( * ) Notice: Subject to any disclaimer, the term of this patent is extended or adjusted under 35 U.S.C. 154(b) by 1 day.

(21) Appl. No.: 14/086,498

(22) Filed: Nov. 21, 2013

(65) Prior Publication Data

US 2014/0147118 A1 May 29, 2014

(30) Foreign Application Priority Data

Nov. 23, 2012 (KR) .................. 10-2012-0133972

(51) Int. Cl.
*H04J 14/02* (2006.01)
*H04B 10/40* (2013.01)

(52) U.S. Cl.
CPC .............. *H04J 14/025* (2013.01); *H04B 10/40* (2013.01); *H04J 14/0282* (2013.01)

(58) Field of Classification Search
CPC .. H04B 10/40; H04B 10/572; H04B 10/2503; G08C 23/04–23/06; H04J 14/0235–14/0236; H04J 14/0249–14/0253
USPC .......................................................... 398/95
See application file for complete search history.

(56) References Cited

U.S. PATENT DOCUMENTS

| 2008/0050115 A1* | 2/2008 | Ikai et al. ................. 398/31 |
| 2008/0056720 A1* | 3/2008 | Sitton et al. .............. 398/98 |
| 2008/0089699 A1* | 4/2008 | Li et al. ................... 398/197 |
| 2009/0232493 A1* | 9/2009 | Tu .......................... 398/17 |
| 2011/0236017 A1* | 9/2011 | Ohlen ...................... 398/34 |
| 2012/0121256 A1* | 5/2012 | Suzuki et al. ............. 398/34 |
| 2014/0233953 A1* | 8/2014 | Giorgi et al. .............. 398/68 |

FOREIGN PATENT DOCUMENTS

KR   10-2008-0052332 A   6/2008

* cited by examiner

*Primary Examiner* — David Payne
*Assistant Examiner* — Casey Kretzer
(74) *Attorney, Agent, or Firm* — Rabin & Berdo, P.C.

(57) ABSTRACT

There is provided an optical transceiver apparatus including an optical transmitter configured to transmit light of variable wavelength, an optical receiver configured to receive light generated from an opposite light source, and a controller configured to perform initialization to a wavelength corresponding to when an intensity of light received by the optical receiver is greater than or equal to a reference power, while varying the wavelength of light output by the optical transmitter.

11 Claims, 7 Drawing Sheets

APPARATUS FOR TRANSMITTING/RECEIVING VARIABLE-WAVELENGTH OPTICAL SIGNAL

CROSS-REFERENCE TO RELATED APPLICATION

This application claims the benefit under 35 U.S.C. §119 (a) of Korean Patent Application No. 10-2012-0133972, filed on Nov. 23, 2012, in the Korean Intellectual Property Office, the entire disclosure of which is incorporated herein by reference for all purposes.

BACKGROUND

1. Field

The following description relates to optical communication, and more particularly, to an apparatus for transmitting/receiving variable-wavelength signals in a passive optical network.

2. Description of the Related Art

Fiber to the home (FTTH) based on wavelength division multiplexing (WDM), that is, a wavelength division multiplexing-passive optical network (WDM-PON), is a communication scheme in which communication between a central base station and subscribers is achieved using wavelengths respectively set for the subscribers. Such a communication scheme provides each subscriber with independent and highly secure, high-capacity communication service. In addition, the WDM based communication scheme, which is distinguished from a time division multiplexing (TDM) scheme, performs light source modulation/demodulation only for a subscriber, so even if the number of subscribers increases, the bandwidth provided to the subscriber does not change.

In order to implement the above WDM-PON, a light source having a number of unique wavelengths corresponding to the number of subscribers are needed. Accordingly, the use of a broadband variable-wavelength light source for colorless characteristics is one key to resolving an inventory issue (a difficulty in managing the inventory of light sources when fixed wavelength light sources are used and a n-channel providing system requires a total of n light sources).

That is, in order to implement the WDM-PON, there is a need for certain light sources having different wavelengths, which are allocated to fibers installed at each subscriber premises. Accordingly, when an ONT accesses a network, a series of initializing (allocation) functions, including an upstream light source wavelength allocation function and an arrangement function according to the allocated wavelength, are important.

A general wavelength initialization method uses an additional arrayed waveguide grating (AWG), an FP-filter, and a monitoring photo diode (PD). Such a conventional wavelength initialization method causes an increase in the cost of light sources and leads to a bulky structure, due to the additional cost of optical elements and the space taken by the optical elements. In order to compensate for such shortcomings, a wavelength initialization method using an optical layer has been suggested. According to this method, the wavelength is determined at an optical layer, based on an optical signal transmitted from an optical line terminal (OLT). A representative example of the wavelength allocation and wavelength initialization method above includes a wavelength initialization method using an external lookup table and a variable-wavelength optical transceiver using the same, disclosed in Korean Patent Publication No. 10-2008-0052332.

According to the conventional wavelength initialization method using an external lookup table and the variable-wavelength optical transceiver using the same, a wavelength initialization is performed by mounting a lookup table on a controller of an external host and sharing a control function including a lookup function with the host. The conventional wavelength initialization method using the external lookup table and the variable-wavelength optical transceiver using the same have a disadvantage in that when light sources are manufactured, the lookup table needs to be experimentally constructed and stored for a corresponding light source, and thus the number of light sources produced per unit time decreases.

In addition, optical signals use protocols, which leads to the paradox of wavelength initialization being impossible unless an initial optical path is set. That is, in the WDM-scheme where wavelength initialization represents setting of the optical path, in order to perform wavelength initialization using protocols, wavelength initialization needs to have already happened. The conventional TDM scheme, which uses a fixed wavelength, solves this paradox on the basis that the available wavelengths are fixed in the TDM scheme, so that wavelength initialization itself is not required.

In addition, the conventional wavelength initialization method using the external lookup table and the variable-wavelength optical transceiver using the same perform wavelength initialization through communicating with the OLT, and thus an error rate increases. In addition, the conventional wavelength initialization method using the external lookup table and the variable-wavelength optical transceiver using the same set the wavelength by use of a lookup table that is already set, and thus wavelength fine tuning is not achieved when each wavelength is set.

SUMMARY

The following description relates to an optical transceiver capable of initializing the wavelength of an optical transmitter by only measuring the intensity of light without using protocols.

In one general aspect, an optical transceiver apparatus includes an optical transmitter, an optical receiver and a controller. The optical transmitter may be configured to transmit light of variable wavelength. The optical receiver may be configured to receive light generated from an opposite-side light source. The controller may be configured to perform initialization to a wavelength corresponding to when an intensity of light received by the optical receiver is greater than or equal to a reference power, while varying the wavelength of light output by the optical transmitter.

In another general aspect, an optical transceiver apparatus includes an optical transmitter, a wavelength recognizer, and a controller. The optical transmitter may be configured to transmit light of variable wavelength. The wavelength recognizer may be configured to recognize a wavelength of received light. The controller may be configured to set a wavelength of the optical transmitter to a predetermined wavelength corresponding to the wavelength recognized through the wavelength recognizer.

In another general aspect, an optical transceiver apparatus includes an optical transmitter configured to transmit light of variable wavelength; a first wavelength recognizer configured to recognize a wavelength of received light; a second wavelength recognizer configured to recognize the wavelength of light output by the optical transmitter; and a controller configured to set a wavelength of the optical transmitter to a predetermined wavelength corresponding to the wavelength recognized through the first wavelength recognizer, wherein the controller finely tunes the wavelength of the optical transmitter by referring to the wavelength of light recognized by the second wavelength recognizer.

Other features and aspects will be apparent from the following detailed description, the drawings, and the claims.

Figure 1:
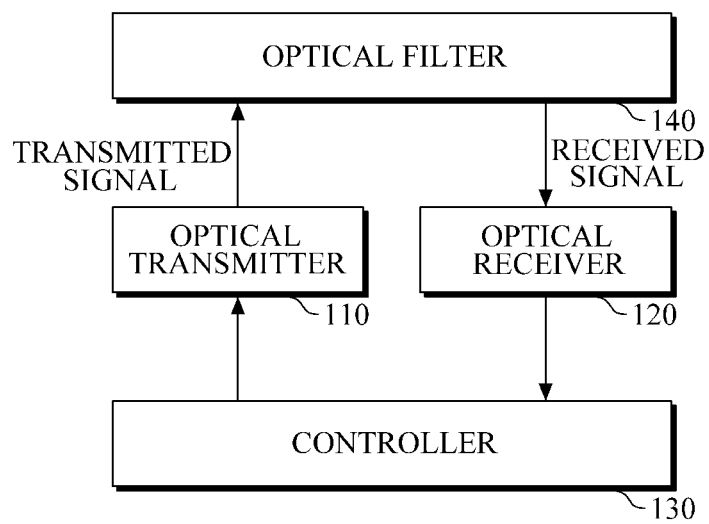
FIG. 1 is a diagram illustrating an optical transceiver in accordance with an embodiment of the present disclosure.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will suggest themselves to those of ordinary skill in the art. Also, descriptions of well-known functions and constructions may be omitted for increased clarity and conciseness. In addition, some terms used below are defined in consideration of functions in the present invention and may be changed according to the intentions of a user or an operator or conventional practice. Therefore, the definitions must be based on content throughout this disclosure.

FIG. 1 is a diagram illustrating an optical transceiver in accordance with an embodiment of the present disclosure.

Referring to FIG. 1, an optical transceiver includes an optical transmitter 110, an optical receiver 120, a controller 130 and an optical filter 140. The optical transmitter 110 is a variable-wavelength light source.

The controller 130 enables a wavelength of the optical transmitter 110 to vary. In this case, parameters to vary the wavelength may include the current, the temperature, the voltage, the index of refraction, and the length of a resonator. For convenience, the following description relates to an example case of varying the current.

As the current input into the optical transmitter 110 varies under the control of the controller 130, the wavelength of light output by the optical transmitter 110 varies. When an opposite-side optical transceiver (not shown) receives and recognizes the output light of the optical transmitter 110, communication starts. That is, the opposite-side optical transceiver recognizes light, and transmits light in response to the recognized light, and the optical receiver 120 receives the light from the opposite-side optical transceiver.

The controller 130 detects the current (a wavelength variation parameter) applied to the optical transmitter 110 at the time when communication starts and at the time when communication ends. At the time when communication starts, a signal exceeding a reference power is input to the optical receiver 120, and at the time when communication ends, a signal below the reference power is input to the optical receiver 120.

The controller 130 determines a value of the current applied to the optical transmitter 110, based on the detected two current values. Preferably, the controller 130 may determine a value of the sum of the detected two values divided by 2 as a value of the current applied to the optical transmitter 110.

In this regard, wavelength initialization in accordance with the present disclosure requires an opposite-side optical transceiver, and unless an optical signal exceeding the reference power is input to the optical receiver 120, the output of the optical transmitter 110 stops. Meanwhile, if an optical signal exceeding the reference power is input to the optical receiver 120, the output of the optical transmitter 110 is generated. In this manner, the power consumption of the opposite-side optical transceiver is reduced.

The optical filter 140 serves to filter a value of a received optical signal having a maximum power, and may be embodied, for example, as an Arrayed Waveguide Grating (AWG).

Figure 2:
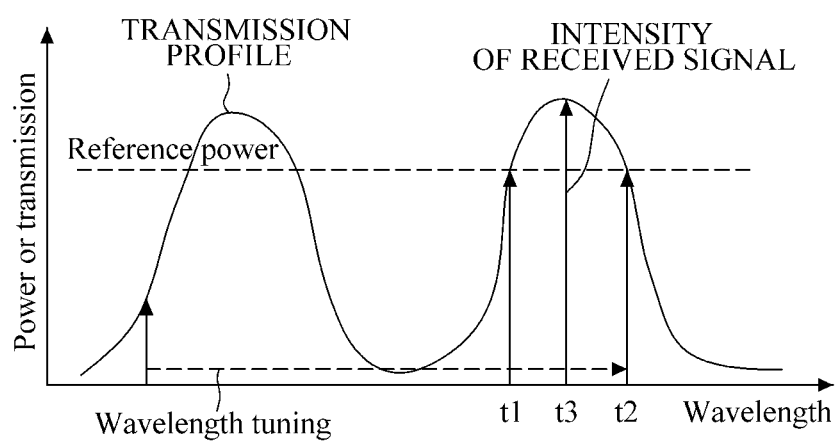
FIG. 2 is a diagram to explain determination of wavelength initialization current for an optical transmitter in accordance with an embodiment of the present disclosure.

FIG. 2 is a diagram to explain determination of wavelength initialization current for an optical transmitter in accordance with an embodiment of the present disclosure.

Referring to FIG. 2, the intensity of a signal received by the optical receiver 120 is plotted versus current input to the optical transmitter 110 to thereby change its output wavelength. A value of the current input to the optical transmitter 110 at a time (t1) when a received optical signal exceeds the reference power, and a value of the current input to the optical transmitter 110 at a time (t2) when a received optical signal is below the reference power, are detected. By use of the two current values, an initialization current value to be input to the optical transmitter 110 is determined. Preferably, a middle value between the two current values is determined as the initialization current value.

For example, when a value of the current at the time of t1 is 2 mA, and a value of the current at the time of t2 is 3 mA, a current value of 2.5 mA is determined as the initialization current. In result, when a current of 2.5 mA flows, a signal having the maximum power is received by the optical receiver 120.

Figure 3:
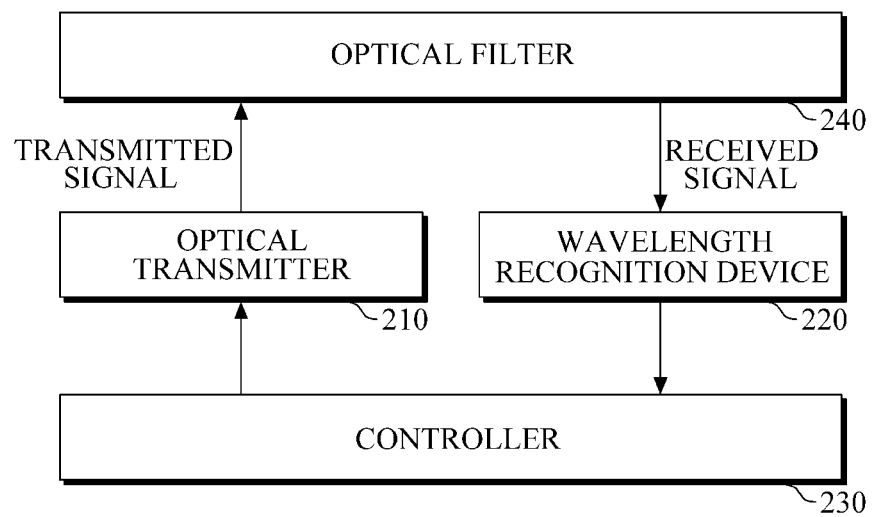
FIG. 3 is a diagram illustrating an optical transceiver in accordance with another embodiment of the present disclosure.

FIG. 3 is a diagram illustrating an optical transceiver in accordance with another embodiment of the present disclosure.

Referring to FIG. 3, an optical transceiver in accordance with another embodiment of the present disclosure includes an optical transmitter 210, a wavelength recognition device (WRD) 220, a controller 230 and an optical filter 240. The optical transmitter 210 represents a variable-wavelength light source.

An optical receiver (not shown) receives light from an opposite-side optical transceiver. The wavelength recognition device 220 is located at a side of the optical receiver to recognize the wavelength of an optical signal received from the opposite-side optical transceiver (not shown).

The controller 230 allows a transmission wavelength of the optical transmitter 210 to be adjusted to the wavelength recognized by the wavelength recognition device 20, or to a wavelength recognized based on a predetermined reference. In this case, parameters to vary the wavelength may include the current, the temperature, the voltage, the index of refraction, and the length of a resonator. For convenience, the following description relates to an example case of varying the current.

As the current input to the optical transmitter 210 varies under the control of the controller 230, the wavelength of the output light of the optical transmitter 210 varies. The optical transmitter 210 and the controller 230 may use a lookup table 230. Accordingly, the wavelength recognition device 220 may determine a range of wavelength.

The optical transceiver in accordance with this embodiment of the present disclosure, without adjusting the output wavelength of the optical transmitter 210 in a continuous manner, performs wavelength initialization in one operation, so that the time for wavelength initialization is reduced. That is, if the wavelength recognition device 220 is manufactured to have a high resolving power, the manufacturing cost increases according to an initial process condition and a yield rate. Accordingly, there is a need for a wavelength initialization method using the wavelength recognition device 220 having a low resolving power. In this case, the wavelength recognition device 220 is used to select a range of wavelength. The wavelength recognition device 220 selects a range of wavelength, and the optical transmitter 210 varies the wavelength within the selected range of wavelength, and stops varying the wavelength if a signal exceeding a reference power is received or communication starts.

Preferably, the wavelength of the optical transmitter 210 is controlled to a middle value between a wavelength corresponding to when communication starts (upon initial receipt of an optical signal) and a wavelength corresponding to when communication ends (upon termination of a received optical signal). In this case, as the range of wavelength is selected, the number of wavelengths to be found decreases, and thus the time for wavelength initialization is reduced.

Figure 4:
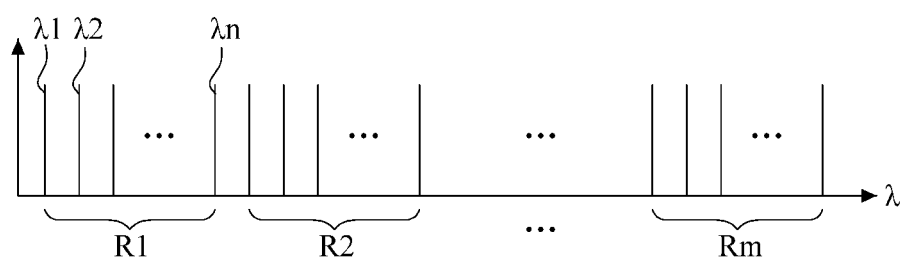
FIG. 4 a diagram to explain determination of wavelength initialization current for output light of an optical transmitter in accordance with another embodiment of the present disclosure.

FIG. 4 is a diagram to explain determination of wavelength initialization current for output light of an optical transmitter in accordance with another embodiment of the present disclosure.

Referring to FIG. 4, a system composed of m×n wavelengths is illustrated. The time for wavelength initialization may be regarded as, for convenience, being reduced from m×n to n.

Figure 5:
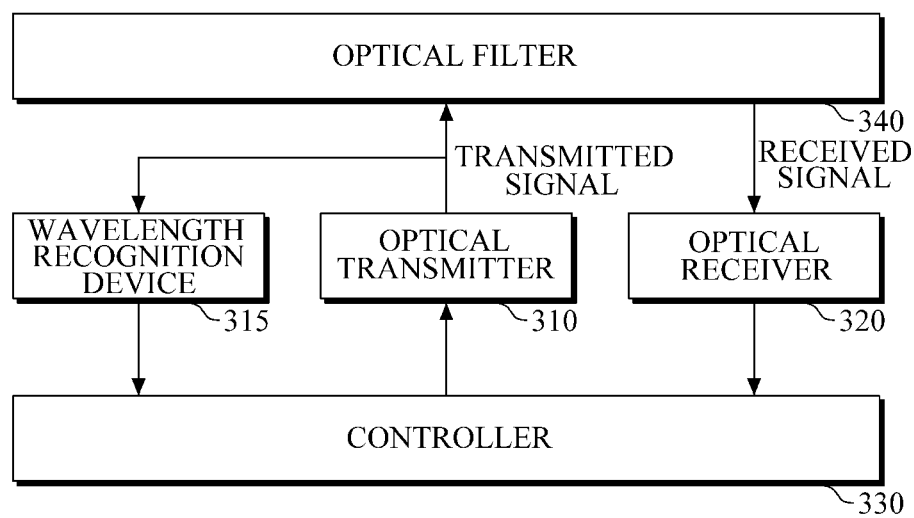
FIG. 5 is a diagram illustrating an optical transceiver in accordance with still another embodiment of the present disclosure.

FIG. 5 is a diagram illustrating an optical transceiver in accordance with still another embodiment of the present disclosure.

Referring to FIG. 5, an optical transceiver in accordance with still another embodiment of the present disclosure includes an optical transmitter 310, a wavelength recognition device (WRD) 315, an optical receiver 320, a controller 330 and an optical filter 340. The optical transmitter 310 represents a variable-wavelength light source.

The controller 330 allows the wavelength of the optical transmitter 310 to vary. In this case, parameters to vary the wavelength may include the current, the temperature, the voltage, the index of refraction, and the length of a resonator. For convenience, the following description relates to an example case of varying the current.

As the current input to the optical transmitter 310 varies under the control of the controller 330, the wavelength of the output light of the optical transmitter 310 varies. When an opposite-side optical transceiver (not shown) receiving the output light of the optical transmitter 310 recognizes the light, communication starts. That is, the opposite-side optical transceiver recognizes light, and transmits light in response to the recognized light, and the optical receiver 320 receives the light from the opposite-side apparatus for transmitting/receiving optical signals.

The controller 330 continues changing the wavelength of the optical transmitter 310 if the intensity of optical signals received by the optical receiver 320 is below the reference power.

Meanwhile, the controller 330, if the intensity of the optical signals received by the optical receiver 320 exceeds the reference power, fixes the wavelength of the optical transmitter 310.

In this regard, wavelength initialization in accordance with the present disclosure requires an opposite-side optical transceiver, and unless an optical signal exceeding the reference power is input to the optical receiver 320, the output of the optical transmitter 310 stops. Meanwhile, if an optical signal exceeding the reference power is input to the optical receiver 320, the output of the optical transmitter 310 is generated. In this manner, the power consumption of the opposite-side optical transceiver is reduced.

The wavelength recognition device 315 recognizes a wavelength of light output from the optical transmitter 310, and outputs the recognized wavelength. As a result, the controller 330 may finely tune the wavelength of the optical transmitter 310 by the wavelength recognition device 315. The use of a wavelength initialization method according to still another embodiment of the present disclosure enables change in the wavelength of the optical transmitter 310 occurring during operation to be recognized, and the wavelength to be controlled based on the change.

Figure 6:
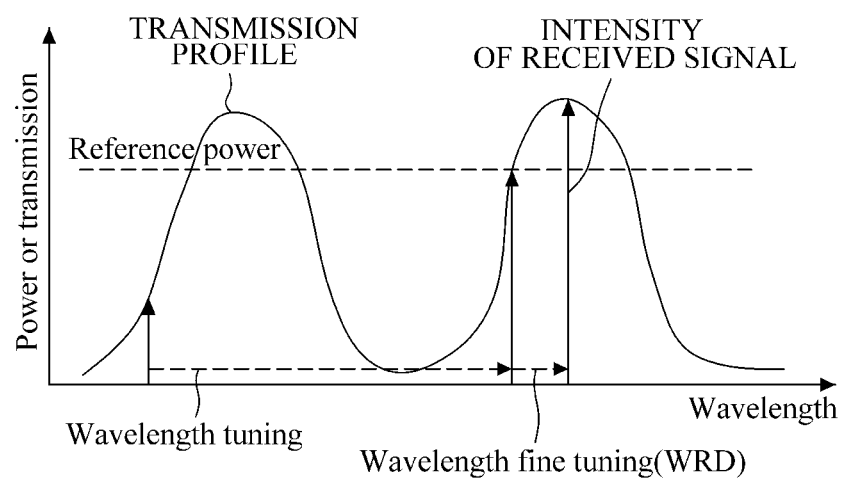
FIG. 6 is a diagram to explain determination of wavelength initialization current for output light of an optical transmitter in accordance with still another embodiment of the present disclosure.

FIG. 6 is a diagram to explain determination of wavelength initialization current for output light of an optical transmitter in accordance with still another embodiment of the present disclosure.

Referring to FIG. 6, a wavelength corresponding to a reference power is subject to wavelength fine tuning to the right side.

Figure 7:
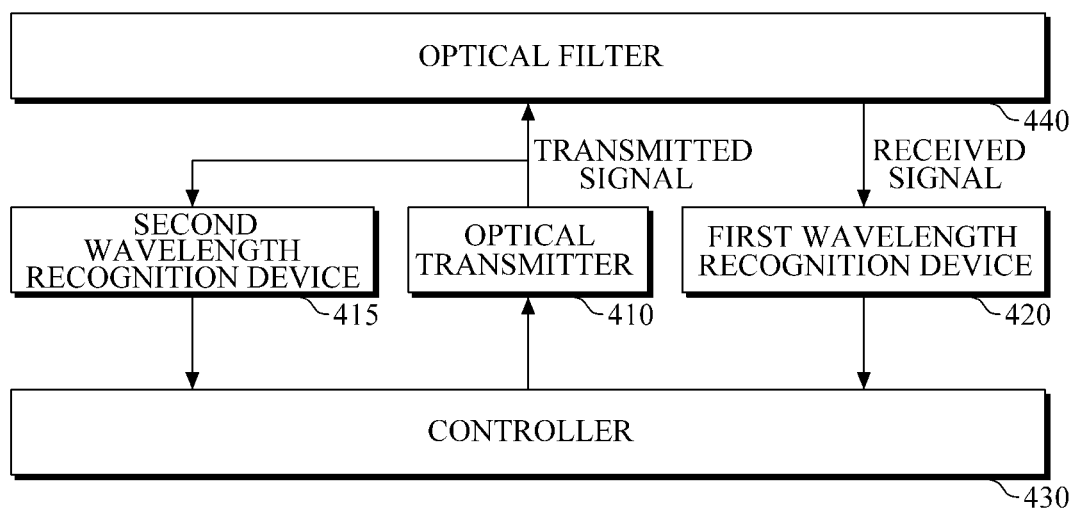
FIG. 7 is a diagram illustrating an optical transceiver in accordance with still another embodiment of the present disclosure.

FIG. 7 is a diagram illustrating an optical transceiver in accordance with still another embodiment of the present disclosure.

Referring to FIG. 7, an optical transceiver in accordance with still another embodiment of the present disclosure includes an optical transmitter 410, a second wavelength recognition device 415, a first wavelength recognition device 420, a controller 430 and an optical filter 440. The optical transmitter 410 represents a variable-wavelength light source.

An optical receiver (not shown) receives light from an opposite-side optical transceiver (not shown). The first wavelength recognition device 420 is located at a side of the optical receiver to recognize a wavelength of the optical signal received from the opposite-side optical transceiver (not shown).

The controller 430 allows a transmission wavelength of the optical transmitter 410 to be adjusted to the wavelength recognized by the first wavelength recognition device 420, or to a wavelength recognized based on a predetermined reference. In this case, parameters to vary the wavelength may include the current, the temperature, the voltage, the index of refraction, and the length of a resonator. For convenience, the following description relates to an example case of varying the current.

As the current input to the optical transmitter 410 varies under the control of the controller 430, the wavelength of the output light of the optical transmitter 410 varies. The optical transmitter 410 and the controller 430 may use a lookup table. Accordingly, the first wavelength recognition device 420 may determine a range of wavelength.

The optical transceiver in accordance with this embodiment of the present disclosure, without adjusting the output wavelength of the optical transmitter 410 in a continuous manner, performs wavelength initialization in one operation, so that the time for wavelength initialization is reduced. That is, if the first wavelength recognition device 420 is manufactured to have a high resolving power, the manufacturing cost increases according to an initial process condition and a yield rate. Accordingly, there is a need for a wavelength initialization method using the first wavelength recognition device 420 having a low resolving power. In this case, the first wavelength recognition device 420 is used to select a range of wavelength. The first wavelength recognition device 420 selects a range of wavelength, and the optical transmitter 410 varies the wavelength within the selected range of wavelength, and stops varying the wavelength if a signal exceeding a reference power is received or communication starts.

Preferably, the wavelength of the optical transmitter 410 is controlled to a middle value between a wavelength corresponding to when communication starts (upon initial receipt of an optical signal) and a wavelength corresponding to when communication ends (upon termination of a received optical signal). In this case, as the range of wavelength is selected, the number of wavelengths to be found decreases, and thus the time for wavelength initialization is reduced.

The second wavelength recognition device 415 recognizes the wavelength of light output from the optical transmitter 410, and outputs the recognized wavelength. As a result, the controller 430 finely tunes the wavelength of the optical transmitter 410 by the second wavelength recognition device 415. The use of a wavelength initialization method according to still another embodiment of the present disclosure enables change in the wavelength of the optical transmitter 410 occurring during operation to be recognized, and the wavelength to be controlled based on the change.

The optical transceiver in accordance with still another embodiment of the present disclosure may be further provided at an optical line terminal (OLT) and an optical network terminal (ONT) (or a tunable laser diode (TLD)) with a device (a field programmable gate array (FPGA) and an electric control part, that is, a media access control (MAC) layer) configured to receive packets.

The MAC layer included in the optical transceiver in accordance with still another embodiment of the present disclosure exchanges information about intensities of signals by use of a predetermined protocol.

As an example, when communication starts after wavelength initialization, the OLT (a place where an opposite-side optical transceiver is located) transmits intensity values of signals input to an optical receiver to the ONT (a place where a subject of a wavelength tuning is located).

The ONT included in the optical transceiver in accordance with still another embodiment of the present disclosure performs wavelength stabilization based on a value of power received. Wavelength initialization is defined as a process in which an optical transceiver is connected to a certain port and looks for a wavelength allocated to the certain port. Wavelength stabilization is defined as a process of detecting the change in wavelength caused by an environmental change after wavelength initialization, and retuning to an allocated wavelength.

According to still another embodiment of the present disclosure, the MAC layer located at the OLT transmits information about intensity values of signals, determined according to communication settings, to the TLD transmitting light according to a certain protocol. The TLD is one type of a variable-wavelength light source (an optical transmitter), and hereinafter, the two terms TLD and variable-wavelength light source are used interchangeably.

The MAC located at the TLD receives information about intensity values of signals, and varies the wavelength of light, which is to be transmitted from the TLD, by use of the information.

As an example, the MAC located at the TLD may control the wavelength variation in consideration of a direction in which the information about intensity values of received signals changes in response to wavelength variation. That is, in a case in which the MAC layer located at the TLD increases a wavelength, if the information about intensity values of received signals increases in value, the MAC layer increases the wavelength of light to be transmitted.

Preferably, the MAC layer located at the TLD periodically varies the wavelength of light transmitted from the TLD in the direction in which the information about intensity values of received signals changes.

As another example, the MAC layer located at the TLD may allow the MAC located at the OLT to perform communication setting based on a starting point at which information about intensities of signals becomes effective.

The present disclosure suggests a wavelength initialization apparatus that is independent of protocols, so that the time for wavelength initialization and the accuracy of wavelength initialization may be implemented to suit the requirements of a designed system.

The present invention can be implemented as computer-readable codes in a computer-readable recording medium. The computer-readable recording medium includes all types of recording media in which computer-readable data are stored. Examples of the computer-readable recording medium include a ROM, a RAM, a CD-ROM, a magnetic tape, a floppy disk, and an optical data storage. Further, the recording medium may be implemented in the form of carrier waves such as used for Internet transmissions. In addition, the computer-readable recording medium may be distributed to computer systems over a network, in which computer-readable codes may be stored and executed in a distributed manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:
1. An optical transceiver apparatus, comprising:
an optical transmitter configured to transmit first light, a wavelength of the first light being variable;
an optical receiver configured to receive second light generated by and transmitted from an opposite-side light source; and a controller configured to initialize the wavelength of the first light by detecting a first intensity of the second light received by the optical receiver at a first time when the received second light has a power greater than a reference power, detecting a second intensity of the second light received by the optical receiver at a second time when the received second light has a power smaller than the reference power, determining an initialization value of the optical transmitter, the initialization value being a middle value of two current values of the optical transmitter respectively at the first and second times, and initializing the wavelength of the first light output by the optical transmitter using the initialization value.

2. The optical transceiver apparatus of claim 1, wherein, in response to a detection that the wavelength of the first light is greater than a predetermined level, the controller varies the wavelength of the first light by receiving the second light generated from the opposite-side light source.

3. The optical transceiver apparatus of claim 1, wherein, in response to a detection that the wavelength of the first light is greater than a predetermined level, the controller adjusts the wavelength of the first light by receiving a signal for fixing the wavelength of the first light from the opposite-side light source.

4. The optical transceiver apparatus of claim 3, wherein the signal for fixing the wavelength of the first light is a pilot tone or a protocol.

5. The optical transceiver apparatus of claim 1, wherein the controller is configured to vary the wavelength of the first light by varying one or more of a current, a temperature, a voltage, an index of refraction, and a length of a resonator.

6. The optical transceiver apparatus of claim 1, wherein the controller derives a first wavelength variation parameter applied to the optical transmitter when communication starts and a second wavelength variation parameter applied to the optical transmitter when the communication ends, and determines a value of a wavelength variation parameter to be applied to the optical transmitter, using the derived first and second wavelength variation parameters.

7. The optical transceiver apparatus of claim 6, wherein the controller determines the value of the wavelength variation parameter by dividing a sum of the derived first and second wavelength variation parameters by 2.

8. An optical transceiver apparatus, comprising:
an optical transmitter configured to transmit first light, a wavelength of the first light being variable;
a wavelength recognizer configured to recognize a wavelength of received second light; and
a controller configured to,
if a resolving power of the wavelength recognizer is equal to or higher than a predetermined value, set the wavelength of the first light to a wavelength corresponding to the wavelength recognized through the wavelength recognizer, and
if the resolving power of the wavelength recognizer is smaller than the predetermined value, select a wavelength range corresponding to the wavelength recognized through the wavelength recognizer using a lookup table, vary the wavelength of the first light within the wavelength range, and stop varying the wavelength of the first light if a power exceeding a reference power is received or communication starts.

9. The optical transceiver apparatus of claim 8, wherein the controller derives a first wavelength variation parameter applied to the optical transmitter when the communication starts and a second wavelength variation parameter applied to the optical transmitter when the communication ends, and determines a value of a wavelength variation parameter, which is applied to the optical transmitter, using the derived first and second wavelength variation parameters.

10. An optical transceiver apparatus, comprising:
an optical transmitter configured to transmit first light, a wavelength of the first light being variable;
an optical receiver configured to receive second light generated by and transmitted from an opposite-side light source;
a wavelength recognizer configured to recognize a wavelength of the first light output from the optical transmitter and output the recognized wavelength; and
a controller configured to initialize the wavelength of the first light by
detecting a first intensity of the second light received by the optical receiver at a first time when the received second light has a power greater than a reference power,
detecting a second intensity of the second light received by the optical receiver at a second time when the received second light has a power smaller than the reference power,
determining an initialization value of the optical transmitter, the initialization value being a middle value of two current values of the optical transmitter respectively at the first and second times,
initializing the wavelength of the first light output by the optical transmitter using the initialization value, and
finely tuning the wavelength of the first light by referring to the wavelength of the first light recognized by the wavelength recognizer.

11. An optical transceiver apparatus, comprising:
an optical transmitter configured to transmit first light, a wavelength of the first light being variable;
a first wavelength recognizer configured to recognize a wavelength of received second light;
a second wavelength recognizer configured to recognize the wavelength of the first light output by the optical transmitter; and
a controller configured to
if a resolving power of the wavelength recognizer is equal to or higher than a predetermined value, set the wavelength of the first light to a wavelength corresponding to the wavelength recognized through the first wavelength recognizer,
if the resolving power of the wavelength recognizer is smaller than the predetermined value, select a wavelength range corresponding to the wavelength recognized through the wavelength recognizer using a lookup table, vary the wavelength of the first light within the wavelength range, and stop varying the wavelength of the first light if a power exceeding a reference power is received or communication starts, and
finely tune the wavelength of the first light by referring to the wavelength of the first light recognized by the second wavelength recognizer.

* * * * *